United States Patent [19]

Burley et al.

[11] 4,224,221
[45] Sep. 23, 1980

[54] MODIFIER COMPOSITION FOR AZO PIGMENTS BASED ON 2-HYDROXY-3-NAPHTHOIC ACID

[75] Inventors: David R. Burley, Cranbury; Christopher J. Brookes, Somerville, both of N.J.

[73] Assignee: American Cyanamid Company, Stamford, Conn.

[21] Appl. No.: 1,566

[22] Filed: Jan. 5, 1979

[51] Int. Cl.$^2$ ............................................. C09B 29/10
[52] U.S. Cl. .................................................. 260/202
[58] Field of Search ........................................ 260/202

[56] References Cited

U.S. PATENT DOCUMENTS

| | | | |
|---|---|---|---|
| 978,865 | 12/1910 | Ernst et al. | 260/202 |
| 983,486 | 2/1911 | Ernst et al. | 260/202 |
| 1,001,458 | 8/1911 | Schirmacher et al. | 260/202 |
| 1,003,266 | 9/1911 | Jaesschin et al. | 260/202 |
| 1,052,145 | 2/1913 | Hochstetter | 260/202 |
| 1,283,231 | 10/1918 | Levinstein | 260/202 |
| 3,498,966 | 3/1970 | Mueller | 260/202 X |
| 3,520,870 | 7/1970 | Dombroski et al. | 260/202 X |
| 4,143,036 | 3/1979 | Stefancsik | 260/202 |

Primary Examiner—Paul F. Shaver
Attorney, Agent, or Firm—Bruce F. Jacobs

[57] ABSTRACT

The use of alpha-substituted-2-hydroxy-3-naphthoic acids to replace part of the conventional 2-hydroxy-3-naphthoic acid coupling component results in improved azo dyes.

10 Claims, No Drawings

MODIFIER COMPOSITION FOR AZO PIGMENTS BASED ON 2-HYDROXY-3-NAPHTHOIC ACID

The invention relates to the preparation of azo pigments based on the diazotization of various aromatic amino sulfonic acids and coupling thereof into 2-hydroxy-3-naphthoic acid (BON). More particularly, it relates to the preparation and use of a modifier composition to improve pigment properties.

Azo pigments based on the use of 2-hydroxy-3-naphthoic acid as a coupling component are well-known, c.f. U.S. Pat. No. 3,520,870. Examples of azo pigments of the type are Pigment Red 48 (Color Index No. 15865), Pigment Red 52 (Color Index No. 15860), Pigment Red 57 (Color Index No. 15850), Pigment Red 58 (Color Index No. 15825), and Pigment Red 63 (Color Index No. 15880). They are based on coupling of 2-hydroxy-3-naphthoic acid with the diazo of 6-amino-4-chloro-m-toluenesulfonic acid, 2-amino-5-chloro-p-toluenesulfonic acid, 6-amino-m-toluenesulfonic acid, 3-amino-2-chlorobenzene sulfonic acid, and 2-aminonaphthalene-1-sulfonic acid, respectively. Other analogs are similarly preferred from other aromatic aminosulfonic acids and 2-hydroxy-3-naphthoic acid.

The present invention is based on the discovery that when the 2-hydroxy-3-naphthoic acid coupling component, which is ordinarily used at the rate of about 1 to 1.2 moles per mole of diazo component, is replaced by an equal amount of a coupler composition comprising 2-hydroxy-3-naphthoic acid and one or more modifier compounds, defined hereinbelow, the resulting pigment is improved to the extent that one or more of the following result: (1) mass tone is darkened, (2) tint is yellower (sometimes bluer), (3) pigment strength is increased, and (4) gloss and transparency properties are increased.

Modifiers have been used in pigment manufacture before. Various impurities in the starting materials are known to participate in the chemical reaction and produce variations in the color properties and physical properties of the finished pigments. One known example of a modifier in the case of lithols is alpha naphthol, which has a close chemical relationship to beta naphthol used in their manufacture. In the case of azo pigments, in accordance with the present invention, certain compounds related to 2-hydroxy-3-naphthoic acid produce unexpected results when used as modifiers in the pigment reaction, i.e. the rate of the coupling is increased and the pigment particle size is altered, resulting in changes in mass tone, tint, and strength. The use of the modifier compounds thus provides an opportunity to control the characteristics of the ultimate pigment.

The modifier compounds which are useful herein include compounds closely related structurally to 2-hydroxy-3-naphthoic acid. They are α-substituted 2-hydroxy-3-naphthoic acids, and they include:
1-nitro-2-hydroxy-3-naphthoic acid,
1-chloro-2-hydroxy-3-naphthoic acid,
1-methyl-2-hydroxy-3-naphthoic acid,
1-bromo-2-hydroxy-3-naphthoic acid,
2,2'-dihydroxy-3,3'-dicarboxy-1,1'-dinaphthyl[1,1'-bis(2-hydroxy-3-naphthoic acid)], and the like, or mixtures thereof.

One useful method for the preparation of an effective modifier composition is to oxidize 2-hydroxy-3-naphthoic acid with ferric chloride or ferric sulfate. This oxidation, depending on the reaction conditions, provides a mixture containing varying amounts of 1-chloro-2-hydroxy-3-naphthoic acid, 2,2'-dihydroxy-3,3'-dicarboxy-1,1'-dinaphthyl, unreacted 2-hydroxy-3-naphthoic acid, and small amounts of unknown by-products. Such mixtures are effectively used as modifiers, as well as one or more of their components, or the above mentioned 1-bromo-2-hydroxy-3-naphthoic acid.

The azo pigments of the present invention, as the calcium, barium, strontium, or manganese salts of the carboxylic acid, are prepared by conventional coupling procedures from the appropriate aminosulfonic acid and the 2-hydroxy-3-naphthoic acid coupling component using a molar ratio of aminosulfonic acid to coupling component of from about 1/1 to about 1/1.2. The coupling component, in accordance with the invention, will comprise from about 90 to 99 percent by weight of 2-hydroxy-3-naphthoic acid and from about 1 to 10 percent by weight of the α-substituted 2-hydroxy-3-naphthoic acid modifier compound.

In a typical coupling preparation (not using the modifiers of this invention), a solution of 21.4 grams of 2-hydroxy-3-naphthoic acid is prepared in 740 ml of water containing 10 grams of sodium hydroxide. A solution of 25 grams 6-amino-4-chloro-m-toluenesulfonic acid is dissolved in 370 ml of water with pH adjusted to 8.5. The solution is cooled and 112 ml of 10% hydrochloric acid is added, followed by 28 ml of 4 N sodium nitrite solution. After stirring for about 30 minutes, a solution of 22.3 grams of calcium chloride, one gram of strontium nitrate, and 100 ml of slightly acidified water is added. This reaction mixture is then rapidly mixed with the solution of 2-hydroxy-3-naphthoic acid, the resulting mixture is held for an additional period of stirring at 30° C., and then heated to near boiling. The pigment (Pigment Red 48) is filtered, washed with water, and dried.

In the above typical procedure, in accordance with the invention, the 2-hydroxy-3-naphthoic acid is substituted by a coupler composition, as defined, containing a modifier compound. This results in an improved pigment.

The resulting pigment may be used as is or further conditioned by various standard conditioning and end-treatments known in the art, such as U.S. Pat. No. 3,520,870 incorporated herein by reference. For certain purposes, when the coupling is completed, the pigment may then be converted to the metallic salt in the presence of wood rosin. Thus, in the above preparation, the coupling is completed in the absence of the calcium and strontium salts, and a wood rosin solution is added prior to the addition of the metal salts. A suitable wood rosin solution may be prepared by adding 14 parts of sodium hydroxide as a 30% solution to 70 parts of wood rosin (abietic acid) in 1734 parts of water and heating at the boiling point with stirring. Similarly, the pigment may be end-treated with an aluminum salt to improve pigment properties. Thus, basic aluminum acetate (prepared by slurrying 18.5 parts of dry aluminum hydrate and 18 parts of glacial acetic acid in 90 parts of water) may be added to the pigment suspension in the above example before filtration, and the mixture held at 75° C. for about 40 minutes. The pigment may then be filtered, washed chloride-free, and dried.

A different method of improving the pigment involves heating a suspension of the pigment in salt form, as described, by simultaneously adding a solution of 15 parts of aluminum chloride in 650 parts of water and a solution of 3 parts of sodium hydroxide in 319 parts of water, the pigment suspension being held at a temperature of about 75° C. for about 30 minutes. The pigment is filtered, washed free of chlorides, and dried at 80° C.

Still another method of end-treating the pigment involves adding to the pigment suspension before filtration at about 100° C. 15 parts of aluminum chloride in 650 parts of water. The treated pigment is held at 75° C. for 45 minutes at a pH of 6.0–7.0 and the solid material is filtered, washed chloride-free, and dried at 80° C.

The following non-limiting examples show the preparation of the modifiers useful herein as well as the use thereof to produce improved pigments.

EXAMPLE 1

Oxidation of 2-Hydroxy-3-Naphthoic Acid (A) A vessel is charged with 181 gallons of water, 4224 lbs. of 47% ferric chloride solution and the volume adjusted to 843 gallons with water. The solution is heated to 85°–90° C. and held at that temperature.

(B) A vessel is charged with 663 gallons of water, 2782 lbs. of 24% sodium hydroxide and to this is added 2165 lbs. of 2-hydroxy-3-naphthoic acid. The mixture is heated to 85°–90° C.

(C) The contents of (B) are added to the contents of (A) over a period of 45 minutes, keeping the temperature below 100° C. The mixture is stirred for 2 hours at 95°–100° C. and cooled to 70°–75° C.

(D) A vessel is charged with 11450 lbs. of 24% sodium hydroxide and 400 lbs. of Hyflo ® Super-Cel. The mixture (C) is added to this mixture of sodium hydroxide and Super-Cel, keeping the temperature below 75° C.

(E) The mixture from (D) is filtered and the filtrate is added to a vessel containing 560 gallons of water and 2670 lbs. of 93% sulfuric acid at 20°–25° C., keeping the temperature at 20°–25° C. The precipitate which forms is filtered, washed with water, and dried.

A typical composition comprises about 47–48% unoxidized 2-hydroxy-3-naphthoic acid, about 15% 1-chloro-2-hydroxy-3-naphthoic acid, about 34–35% 2,2'-dihydroxy-3,3'-dicarboxy-1,1'-dinaphthyl[1,1'-bis(2-hydroxy-3-naphthoic acid)] and about 3% unknown materials.

EXAMPLE 2

Oxidation of 2-Hydroxy-3-Naphthoic Acid

A hot solution of 55.5 grams of ferric sulfate hydrate in 60 ml of water was added to 20 grams of 2-hydroxy-3-naphthoic acid dissolved in 300 ml of water containing 4 grams of sodium hydroxide. The solids were collected by filtration and stirred into dilute caustic. The iron hydroxide was removed by filtration and the filtrate acidified to precipitate impure 2,2'-dihydroxy-3,3'-dicarboxy-1,1'-dinaphthyl. The product was filtered, washed with water, and dried.

EXAMPLE 3

Oxidation of 2-Hydroxy-3-Naphthoic Acid

A hot solution of 130 grams of ferric chloride in 300 ml of water is added to a hot solution of 50 grams of 2-hydroxy-3-naphthoic acid in 750 ml of water containing 10 grams of sodium hydroxide. After 20 minutes, the solid product is filtered and dissolved in 600 ml of 5% sodium hydroxide and the iron hydroxide which forms is filtered. The filtrate is acidified and the product formed is filtered, washed with water, and dried to give 48.5 grams of impure 2,2'-dihydroxy-3,3'-dicarboxy-1,1'-dinaphthyl. This is recrystallized from 80% acetic acid.

EXAMPLE 4

Chlorination of 2-Hydroxy-3-Naphthoic Acid

A solution of 10.5 grams of 2-hydroxy-3-naphthoic acid in 500 ml of glacial acetic acid was held at 18° C. as chlorine gas was bubbled in. The crystals which formed were filtered and the filtrate further chlorinated. This was repeated two more times giving 5.56 grams of product. This was recrystallized from acetic acid to give 1-chloro-2-hydroxy-3-naphthoic acid, m.p. 234°–235° C.

A similar procedure is used to prepare 1-bromo-2-hydroxy-3-naphthoic acid except that bromine is used instead of chlorine.

EXAMPLE 5

Bromination of 2-Hydroxy-3-Naphthoic Acid

2-Hydroxy-3-naphthoic acid (9.4 grams, 0.05 mole) was dissolved in 200 grams water containing 20 grams of sodium hydroxide. The solution was heated to 100° C. and 51.4 grams (0.5 mole) of sodium bromide was added to give a saturated solution. Ferric sulfate (25 grams) in 30 ml of water was added and the mixture heated at 100° C. for 30 minutes. The mixture was cooled, 100 ml of 10% NaOH was added, and then Hyflo filter aid. After filtration, the clarified solution was acidified with 50% HCl and the resulting bright yellow precipitate was filtered and dried at 80° C. Yield 9.5 grams of a mixture of about equal amounts of 2-hydroxy-3-naphthoic acid and 1-bromo-2-hydroxy-3-naphthoic acid.

EXAMPLE 6

Pigment Red 48 (C.I. No. 15865) was prepared as the barium salt using the typical procedure described above except that an equivalent amount of barium chloride was used instead of calcium chloride. In preparing the pigment, 5 percent (1.07 grams) of the 2-hydroxy-3-naphthoic acid used was replaced by an equal amount of the oxidation mixture of Example 1. The total amount of the coupling agent used, including the additive, contained 0.16 gram of 1-chloro-2-hydroxy-3-naphthoic acid and 0.375 gram of 2,2'-dihydroxy-3,3'-dicarboxy-1,1'-dinaphthyl. The resulting red pigment was slightly to moderately darker in mass tone than standard, considerably bluer in shade, and about 8% stronger.

When 10% by weight of the 2-hydroxy-3-naphthoic acid was replaced by the additive, the resulting pigment was very much darker in mass tone, very much bluer in shade, and about 10% stronger.

EXAMPLE 7

Pigment Red 48 was prepared as described in the above typical preparation as the calcium salt, except that a portion of the 2-hydroxy-3-naphthoic acid was replaced by an equal weight portion of a modifier composition obtained in a manner similar to Example 1. The modifier composition contained 7% 1-chloro-2-hydroxy-3-naphthoic acid, 17.3% 2,2'-dihydroxy-3,3'-dicarboxy-1,1'-dinaphthyl and 75.7% 2-hydroxy-3-naphthoic acid. The amount of 2-hydroxy-3-naphthoic acid replaced was 4%, 8.4%, 11.2%, and 34%, respectively, resulting in coupler compositions containing about 99%, 98%, 97%, 95%, and 92% 2-hydroxy-3-naphthoic acid and 1,2,3,5 and 8% modifier compounds, respectively. Results of evaluations of the different pigments were as follows:

| Sample | % Modifier Composition | Mass Tone | Shade | Strength vs. Standard |
|---|---|---|---|---|
| A | 4 | considerably darker | moderately yellower | 100% |
| B | 8.4 | much darker | moderately yellower | 119 |
| C | 11.2 | very much darker | considerably yellower | 120 |
| D | 23 | darker than C | moderately yellower | 114 |
| E | 34 | darker than D | moderately yellower | 115 |

The results show the dramatic effect of increasing amounts of the modifier on the mass tone of the pigment, the significant effect on the shade and strength.

EXAMPLE 8

Following the procedure of Example 7, 2 percent by weight of the 2-hydroxy-3-naphthoic acid used was replaced by an equal weight amount of 1-chloro-2-hydroxy-3-naphthoic acid. The resulting pigment was considerably to much darker in mass tone, slightly yellower in shade, and about 7 percent stronger.

EXAMPLE 9

Following the procedure of Example 7, 2 percent by weight of the 2-hydroxy-3-naphthoic acid used was replaced by an equal weight amount of 2,2'-dihydroxy-3,3'-dicarboxy-1,1'-dinaphthyl. The resulting pigment was moderately to considerably darker in mass tone, a trace yellower in shade, and about 5 percent stronger.

EXAMPLE 10

Following the procedure of Example 7, 2 percent by weight of the 2-hydroxy-3-naphthoic acid used was replaced by an equal weight amount of 1-bromo-2-hydroxy-3-naphthoic acid. The resulting pigment was much darker in mass tone, moderately yellower in shade, and about equal in strength.

EXAMPLE 11

The procedure of Example 7 is followed to prepare Pigment Red 52 as the calcium salt except that the diazo of 2-amino-5-chloro-p-toluene sulfonic acid is used instead of 6-amino-4-chloro-m-toluene sulfonic acid. Ten percent by weight of the 2-hydroxy-3-naphthoic acid used is replaced by an equal weight amount of the product of Example 1. The resulting Pigment Red 52 is very much darker in mass tone, slightly yellower in shade, and about equal in strength.

EXAMPLE 12

The procedure of Example 7 is followed to prepare Pigment Red 57 as the calcium salt except that the diazo of 6-amino-m-toluenesulfonic acid was used instead of the diazo of 6-amino-4-chloro-m-toluenesulfonic acid.

Part of the 2-hydroxy-3-naphthoic acid coupling agent is replaced by an equal weight amount of the following modifiers:

| A. | Product of Example 1 | 2.0 percent |
|---|---|---|
| B. | 1-bromo-2-hydroxy-3-naphthoic acid | 2.5 percent |
| C. | 1-bromo-2-hydroxy-3-naphthoic acid | 5.0 percent |
| D. | 2,2'-dihydroxy-3,3'-dicarboxy-1,1'-dinaphthyl | 2.5 percent |
| E. | 2,2'-dihydroxy-3,3'-dicarboxy-1,1'-dinaphthyl | 5.0 percent |

Results of evaluations of each of the above pigment compositions are as follows:

| Sample | Mass Tone | Shade |
|---|---|---|
| A | slightly darker | moderately yellower; slightly cleaner |
| B | slightly darker | moderately yellower |
| C | moderately-considerably darker | slightly yellower; moderately cleaner |
| D | trace lighter | trace bluer |
| E | slightly-moderately lighter | slightly bluer |

EXAMPLE 13-28

The procedure of Example 7 is followed to prepare Pigment Red 48 as the calcium salt. In some of the preparations (13 thru 20) from 2 to 10 percent by weight of the 2-hydroxy-3-naphthoic acid used is replaced by an equal weight amount of (A) 1-chloro-2-hydroxy-3-naphthoic acid and (B) 2,2'-dihydroxy-3,3'-dicarboxy-1,1'-dinaphthyl. In other preparations (21 thru 28), (A) and (B) are added to the reaction mixture in an amount of from 2 to 10 percent by weight, based on the weight of the 2-hydroxy-3-naphthoic acid used. The data are shown in the following table:

TABLE

| Example | Modifier | % BON* | % Modifier | Mass Tone** | Tint** | Strength |
|---|---|---|---|---|---|---|
| 13 | None | 100 | — | Standard | Standard | 100 |
| 14 | A | 98 | 2 | mu. dk. | tr. yell. | 103 |
| 15 | A | 95 | 5 | v. mu. dk. | mod. yell.; cl. | 106 |
| 16 | A | 90 | 10 | dk. than (12) | mod. yell.; cl. | 104 |
| 17 | None | 100 | — | Standard | Standard | 100 |
| 18 | B | 98 | 2 | mod.-con. dk. | equal | 101 |
| 19 | B | 95 | 5 | con. dk. | tr. yell. | 101 |
| 20 | B | 90 | 10 | con.-mu. dk. | sl. cl. | 101 |
| 21 | None | 100 | — | Standard | Standard | 100 |
| 22 | A | 100 | 2 | mu. dk. | mod. yell. | 104 |
| 23 | A | 100 | 5 | v. mu. dk. | mod. yell.; con. cl. | 104 |
| 24 | A | 100 | 10 | dk. than (20) | mod.-con. yell.; con. cl. | 101 |
| 25 | None | 100 | — | Standard | Standard | 100 |
| 26 | B | 100 | 2 | mod.-con. dk. | mod. yell. | 103 |

TABLE-continued

| Example | Modifier | % BON* | % Modifier | Mass Tone** | Tint** | Strength |
|---------|----------|--------|------------|-------------|--------|----------|
| 27 | B | 100 | 5 | con. dk. | mod. yell. | 103 |
| 28 | B | 100 | 10 | mu. dk. | mod.-con. yell; cl. | 103 |

*2-hydroxy-3-naphthoic acid; % of stoichiometrically required amount
**mu = much
v = very
tr = trace
sl = slightly
mod = moderately
con = considerably
cl = cleaner
dk = darker
yell = yellower

What is claimed is:

1. In a process for the preparation of an azo pigment whereby the diazo of an aromatic aminosulfonic acid is coupled into 2-hydroxy-3-naphthoic acid, and whereby said pigment is optionally converted into the alkali metal, alkaline earth metal, or manganese salt thereof, the improvement which comprises: using as the coupling component a composition comprising from about 90 to 99 percent by weight of 2-hydroxy-3-naphthoic acid and from about 1 to 10 percent by weight of an alpha substituted-2-hydroxy-3-naphthoic acid.

2. The process of claim 1 wherein said alpha substituted-2-hydroxy-3-naphthoic acid is selected from the group consisting of 1-nitro-2-hydroxy-3-naphthoic acid, 1-methyl-2-hydroxy-3-naphthoic acid, 1-chloro-2-hydroxy-3-naphthoic acid, 1-bromo-2-hydroxy-3-naphthoic acid, 2,2'-dihydroxy-3,3'-dicarboxy-1,1'-dinaphthyl, and mixtures thereof.

3. The process of claim 1 wherein said coupler component is a mixture of compounds obtained by the oxidation of 2-hydroxy-3-naphthoic acid.

4. The process of claim 5 wherein the oxidation is performed with ferric chloride.

5. The process of claim 3 wherein the oxidation is performed with ferric sultate.

6. An azo pigment whereby the diazo of an aromatic aminosulfonic acid is coupled into a composition comprising about 90 to 99 percent by weight of 2-hydroxy-3-naphthoic acid and about 1 to 10 percent by weight of an alpha substituted-2-hydroxy-3-naphthoic acid.

7. The pigment of claim 6 wherein said alpha substituted-2-hydroxy-3-naphthoic acid is selected from the group consisting of 1-nitro-2-hydroxy-3-naphthoic acid, 1-methyl-2-hydroxy-3-naphthoic acid, 1-chloro-2-hydroxy-3-naphthoic acid, 1-bromo-2-hydroxy-3-naphthoic acid, 2,2'-dihydroxy-3,3'-dicarboxy-1,1'-dinaphthyl, and mixtures thereof.

8. The pigment of claim 6 wherein said alpha substituted 2-hydroxy-3-naphthoic acid is a mixture of compounds obtained by the oxidation of 2-hydroxy-3-naphthoic acid.

9. The pigment of claim 8 wherein said oxidation is performed with ferric chloride.

10. The pigment of claim 8 wherein said oxidation is performed with ferric sulfate.